Patented Sept. 12, 1922.

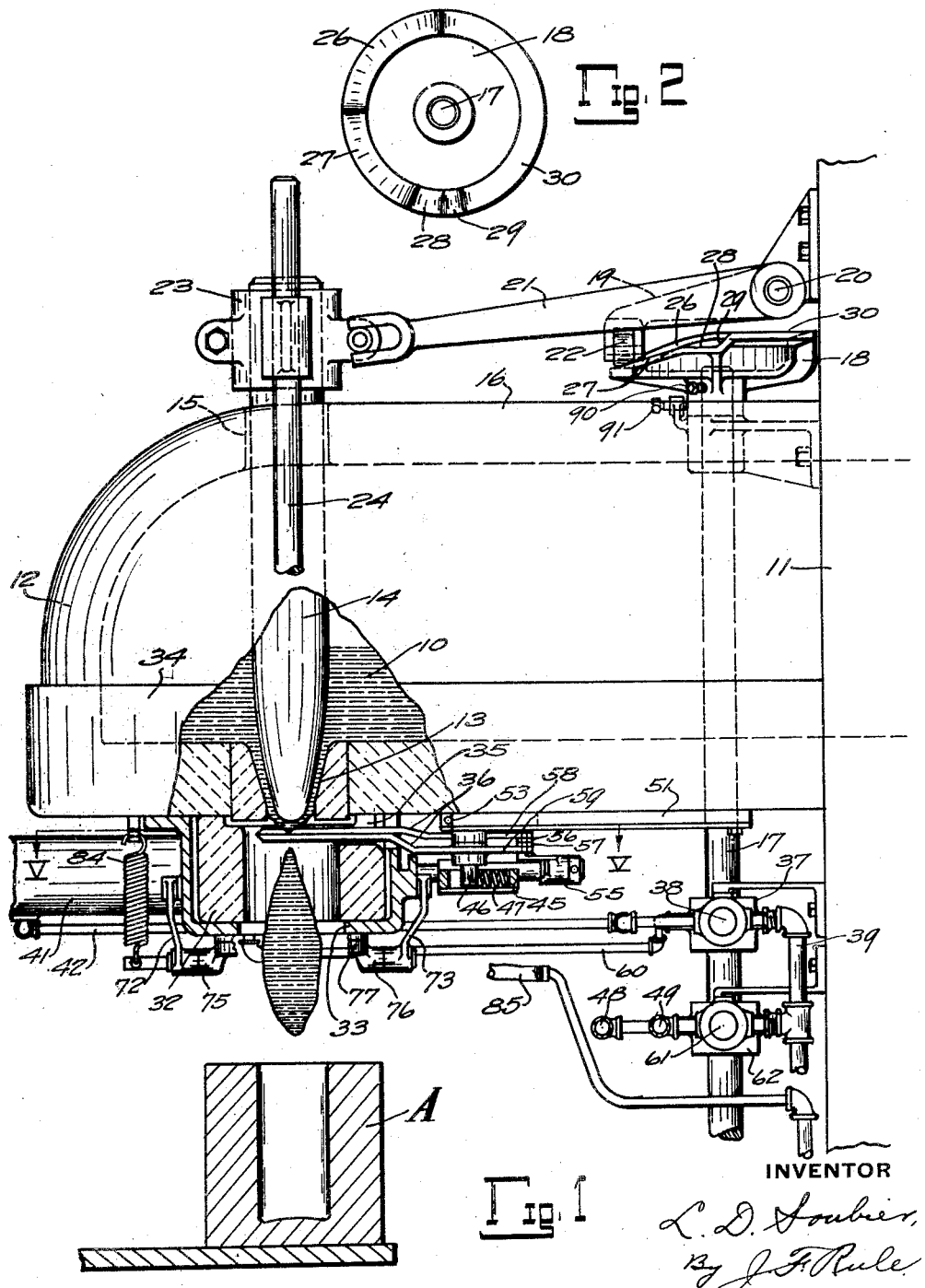

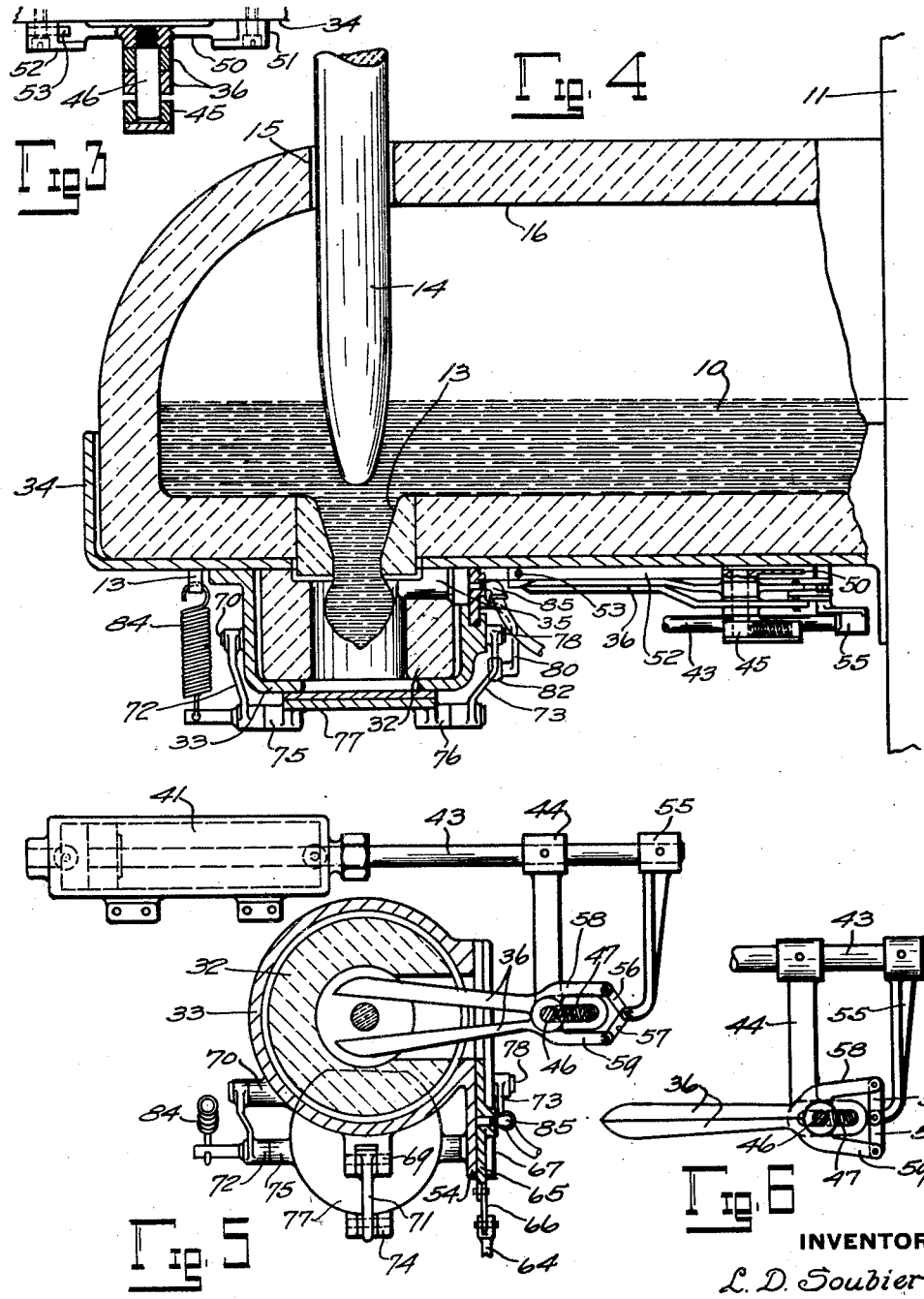
L. D. SOUBIER.
APPARATUS FOR AND METHOD OF PRODUCING CHARGES OF MOLTEN GLASS.
APPLICATION FILED DEC. 20, 1920.
1,428,994. Patented Sept. 12, 1922.
3 SHEETS—SHEET 2.
INVENTOR
L. D. Soubier
By- J. F. Rule.
His Attorney

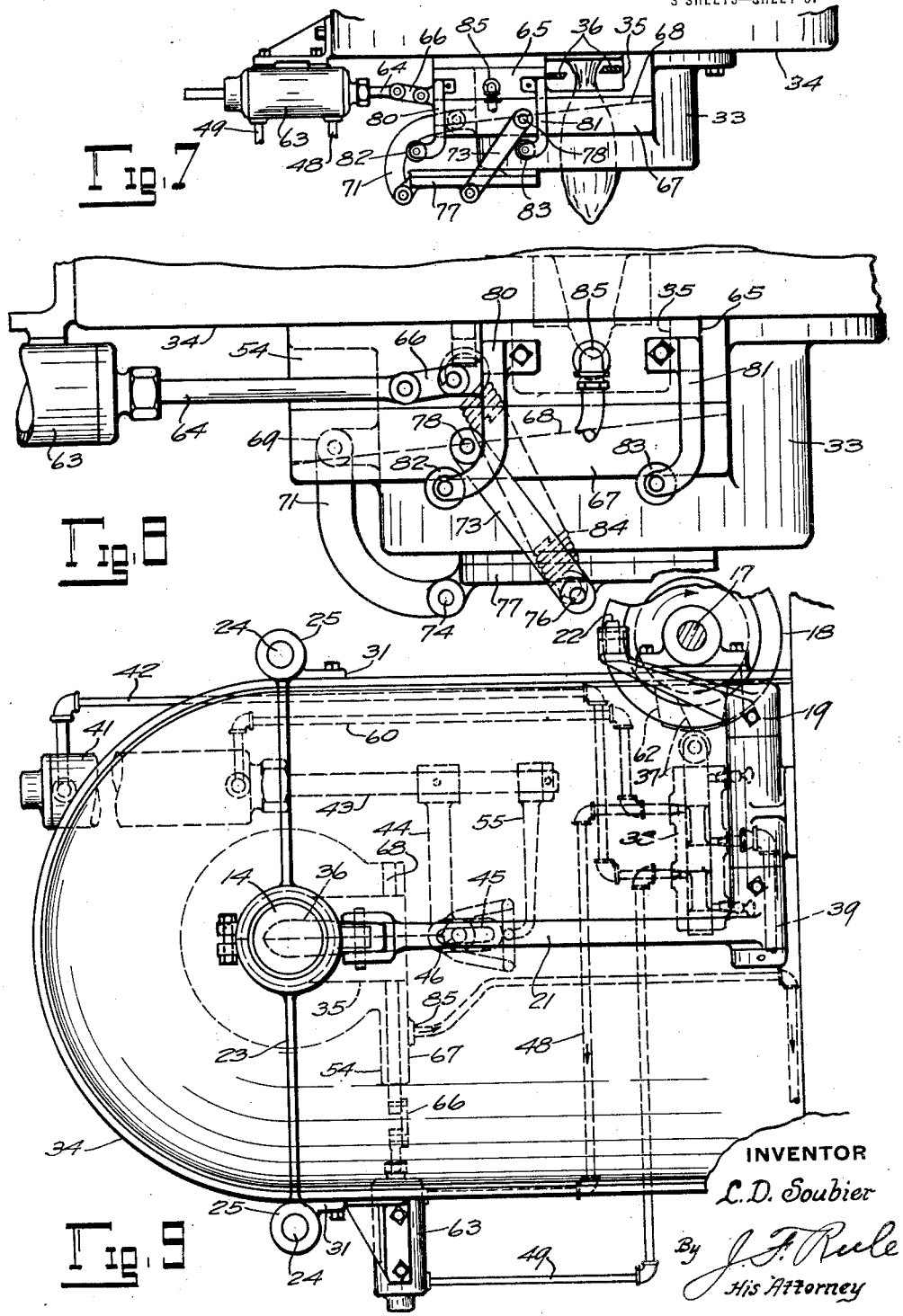

1,428,994

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

APPARATUS FOR AND METHOD OF PRODUCING CHARGES OF MOLTEN GLASS.

Application filed December 20, 1920. Serial No. 431,848.

*To all whom it may concern:*

Be it known that I, LEONARD D. SOUBIER, a citizen of the United States, residing at Toledo, in the county of Lucas and State of Ohio, have invented new and useful Improvements in Apparatus for and Methods of Producing Charges of Molten Glass, of which the following is a specification.

My invention relates to a method and apparatus for producing formed charges of molten glass to be delivered to the molds of a glass forming machine. The invention is of special value for the production of charges or gobs of glass of a size and shape suited for the formation of battery jars, large bottles and various other lines of ware which require charges containing a considerable quantity of glass. Feeders of the type at present in use with which formed charges or gobs are produced are unsuited for producing large size ware, as the shape of the gob cannot be maintained when the size is increased, particularly where a comparatively long slender gob rather than a globulas mass is required, the elongated gob being suited for the molds of battery jars and the like.

An object of the present invention is to overcome the above difficulty by the provision of practical means for producing a formed charge containing a comparatively large quantity of glass but having a small cross sectional area and of suitable shape for entering the mold, and also to rapidly form such a charge, whereby the time interval between the delivery of successive charges is reduced, as may be required for example, to feed large machines of the continuously rotating type.

A further feature of the invention consists in the provision of means whereby the same apparatus may be used in the production of small globular shaped charges of glass for use in making such articles as fruit jar covers, etc.

Other features and advantages will appear hereinafter.

In the accompanying drawings:

Figure 1 is a part sectional view showing the feeder and its operating mechanism.

Figure 2 is a plan view of the plunger operating cam.

Figure 3 is a part sectional view of the shear slide block.

Figure 4 is a sectional elevation showing the preliminary step in the formation of a charge.

Figure 5 is a section taken at the line V—V on Figure 1.

Figure 6 is a view of the cutting mechanism, showing the knives closed.

Figure 7 is a view of the vacuum cylinder in open position and its operating mechanism.

Figure 8 is a side view of the vacuum cylinder closed.

Figure 9 is a plan view of the entire feeder.

Referring particularly to Figures 1 and 4, the molten glass 10 is supplied from a furnace or tank 11 having an extension or boot 12 into which the glass flows and from which it is discharged through an outlet opening 13 in the bottom of the boot. The flow of glass is controlled by a regulator in the form of a vertically reciprocating plunger 14 extending downward through an opening 15 in the boot enclosure 16. The downward movement of the plunger assists in expelling a quantity of the glass while the upward stroke retards the flow, these movements being in synchronism with the movements of the shears and with the vacuum cylinder operations.

Mounted upon a continuously rotating drive shaft 17, which should preferably receive its power from the glass forming machine, is a cam 18 which operates a rock arm 19 fixed to a rock shaft 20 carrying an arm 21. The arm 19 carries a roller 22 running on the cam 18. The arm 21 has an operating connection at its outer end with a yoke 23 carrying the plunger, said yoke being guided in its vertical movements by stationary guide posts 24 extending through bearing sleeves 25 in the opposite ends of the yoke. The parts 24 are secured to brackets 31 on the boot support casting. The cam 18 is so designed that a complete reciprocation of the plunger may be made during about a half revolution of the cam, the plunger being held stationary in its upper position during the other half revolution of the cam. The surface 26 of the cam is such that the plunger will move directly downward from its high position to its lowest position and then be immediately started upward by surface 27. In its withdrawing movement the plunger does not complete its upward travel without interruption, but upon the cam roll 22 reaching the surface 28 it has a slight dwell. The inclined surface 29 of the cam is then traversed by the cam roll, causing the plunger to move upward until the roll reaches the horizontal surface 30 where it rests until the next formation. Mounted upon the bottom of the boot is a cylinder 32 of refractory material surrounding the opening 13 and supported by a casting 33 attached to the boot supporting casting 34. This cylinder has an opening 35 through which shears 36 enter to sever a completed gob of glass.

Referring to Figures 1 and 5, the shears are shown within the cylinder and have just severed the glass. Through a cam 37 mounted upon the continuously rotating shaft 17 (see Fig. 9) a valve 38 of the ordinary slide valve type, connected to a supply pipe 39, is operated to let air enter one end of a piston motor 41 through pipes 42 and withdraw the shears from the cylinder. Rigidly attached to the piston rod 43 is an arm 44 having at its opposite end an elongated bearing 45 in which is freely mounted a pivot pin 46 on which the shears 36 are pivoted.

A spring 47 holds the shear pivot in the forward position in this bearing. The shear pivot 46 is fixed to a slide 50 mounted for reciprocation in slideways 51 and 52. When the shears are moved forward into the cylinder the slide block 50 contacts with a stop pin 53 in the slideway, thereby arresting the shears in the position shown in Figure 5. The piston 43 continues to move forward, compressing the spring 47, closing the shears through the arm 55 and links 56 and 57 connected to the shear extensions 58 and 59, to sever the glass. Immediately upon the release of the air pressure upon the piston, the spring 47 will act to throw the piston back and open the shears. The valve 38 will then be reversed and air admitted to the piston motor through pipes 60 and operated to withdraw the shears.

Mounted beneath the valve 38 is another valve 61 of the same construction, which is actuated by a cam 62 attached to the drive shaft. This valve through pipes 48 and 49 controls a piston motor 63 for operating closures for the cylinder 32. The piston rod 64 of this motor is connected to a sliding door 65 through a link 66, said door being mounted for reciprocation in an extension 67 of the casting 33. This extension is formed in the shape of a guideway, the floor or groove 68 of which is at an angle to the floor of the boot, thereby forming a sort of wedge which allows the door to make a good seal when closed. Pivoted in extensions 69, 70 and 78 on the casting 33 are links 71, 72 and 73 pivoted at their other ends to lugs 74, 75 and 76 on a plate 77, forming a closure for the bottom of the cylinder. Mounted upon the sliding door 65 are two brackets 80 and 81 carrying rolls 82 and 83 respectively. When air is admitted to the piston motor 63 through pipe 49, the door slides forward bringing the roll 82 into contact with the link 73, swinging it about its pivot until the lug 76 has just passed beyond the vertical center line of pivot 78 and then a spring 84 acts to instantaneously throw the cylinder bottom plate into the closed position shown in Figure 7.

The sliding door continues its movement forward, reaching its closed position and thereby making an air tight cylinder. Mounted in the sliding door is a vacuum connection 85 which is closed by the wall of the chamber 32 until it is brought to the opening 35 in said chamber, permitting the air to be exhausted from the chamber. As the door is withdrawn and the vacuum connection passes beyond the opening 35 the vacuum is instantly shut off by the wall 54. When the cylinder is closed, as shown in Figures 3 and 7, the vacuum causes the glass to issue quickly through the orifice 13 and expand in the vacuum chamber, as shown in Figure 3. The piston motor 63 is then actuated to withdraw the sliding door and the plate 77, the movements being the reverse of those described for closing the cylinder bottom. At the same moment the plunger 14 begins its downward stroke and as it reaches its downward limit, the shears enter the cylinder, sever the glass, and allow the gob to drop into a mold A below. Beginning at this point a résumé of the operations necessary for the formation of a charge is as follows:

The plunger having completed its down stroke will immediately start upward and the shears will be withdrawn just after severing the glass. A piston motor will then actuate the sliding door and its connection to close the bottom and side of the cylinder. The closing of the cylinder automatically establishes a vacuum connection which causes the glass at the outlet opening to swell or expand in the shape of a ball. The cam 62 will then actuate its valve to admit air to its piston motor, which will withdraw the sliding door and the cylinder bottom plate, and at the same time the plunger cam will start the plunger downward. There is preferably no lapse of time between the cessation of the vacuum and the beginning of the downward movement of the plunger, so that there will be no attenuation or narrowing in of the glass, which would result in a gob of irregular or undesirable shape. As the plunger continues its downward movement it will force the glass through the outlet opening, giving it a swelling effect until the plunger reaches its extreme downward position. The glass will then be attenuated through the restriction of the outlet by the plunger, and also by the immediate retraction of the plunger. As the plunger reaches its down limit the shears will be projected into the cylinder and will be so timed that the shear will take place at the moment of the greatest attenuation of the stream, severing a completed gob and allowing it to fall into a mold directly beneath. The shears will then be withdrawn from the cylinder, the formation of a gob and a complete cycle of operation having been completed.

For the production of comparatively small charges of a ware nearly globular shape, the plug 14 may be held stationary. This is accomplished by loosening a set screw 90 (Fig. 1) and thereby disconnecting the cam 18 from the drive shaft. The cam is then adjusted to hold the plug at any height desired, depending on the size of gob required, and the cam then locked in its adjusted position by a set screw 91. Evidently the position of the plug will determine the extent it restricts the flow, and consequently the size of gob produced.

Modifications may be resorted to within the spirit and scope of my invention.

What I claim is:

1. The method of forming a charge of molten glass which consists in flowing the glass through an outlet, subjecting the glass beyond the outlet to a regulated pneumatic pressure and thereby controlling the rate of discharge and shape of the discharged mass without mechanical contact with the glass, and severing the charge.

2. The method of forming charges of molten glass which consists in flowing the glass through an outlet orifice into a chamber containing a partial vacuum without permitting the glass to contact with the walls of the chamber, admitting atmospheric pressure into said chamber, and severing the glass.

3. The method of forming a gob of glass which consists in causing the glass to issue from an orifice, applying suction to the issuing glass while keeping it free from contact with any solid, and severing the glass.

4. The method of forming a gob of glass which consists in causing the glass to issue from an orifice, applying suction to the issuing glass during the initial formation of the gob, restoring atmospheric pressure during the further formation of the gob, maintaining the gob free from mechanical contact throughout said formation, and severing the gob.

5. Means for producing formed charges of molten glass comprising in combination a receptacle to contain the glass and provided with an outlet orifice, a chamber into which the glass issues from said orifice, means to produce a partial vacuum in said chamber and thereby regulate the shape and rate of discharge of the issuing glass, and means to sever the glass, said chamber being formed to prevent contact of the glass with the walls thereof.

6. Means for producing formed charges of molten glass comprising in combination a receptacle to contain the glass and provided with an outlet orifice, a chamber into which the glass issues from said orifice, means to produce a partial vacuum in said chamber and thereby regulate the shape and rate of discharge of the issuing glass, means to sever the glass, said chamber being formed to prevent contact of the glass with the walls thereof, a regulator within said container, and means to cause the regulator to apply a periodic force behind the issuing glass and thereby further regulate the discharge of glass.

7. The combination of a container for molten glass having an outlet opening in the bottom thereof, a closed chamber beneath the container with which said opening communicates, means to periodically produce a partial vacuum in said chamber, and means to discharge the glass from said chamber while the latter retains its position in communication with said opening.

8. The combination of a container for molten glass having an outlet opening in the bottom thereof, a closed chamber beneath the container with which said opening communicates, means to periodically produce a partial vacuum in said chamber, means to open said chamber and discharge the glass, and means for severing the charges at a point within said chamber.

9. The combination of a receptacle to contain molten glass, provided with an outlet opening in the bottom thereof, means providing a passageway for the glass as it issues from said opening, means to close the bottom of said passageway and produce a partial vacuum therein by which the rate of discharge of the glass and the shape of the issuing gob of glass are regulated, and means to then remove said bottom and permit the glass to descend.

10. The combination of a receptacle to contain molten glass, provided with an outlet opening in the bottom thereof, means providing a passageway for the glass as it issues from said opening, means to close the bottom of said passageway and produce a partial vacuum therein by which the rate of discharge of the glass and the shape of the issuing gob of glass are regulated, means to then remove said bottom and permit the glass to descend, and a cutter arranged to sever the glass at a point above the bottom of said passageway and adjacent the said outlet.

11. The combination of a container for molten glass having an outlet opening in the bottom thereof, a chamber beneath said opening into which the glass flows, means to produce a partial vacuum in said chamber, a cutter, and means to periodically project said cutter into said chamber and sever the glass at a point adjacent said opening.

12. The combination of a container for molten glass having an outlet opening in the bottom thereof, a chamber beneath said opening into which the glass flows, means to produce a partial vacuum in said chamber, the chamber comprising a movable bottom, means to periodically withdraw said bottom, a cutter, and means to periodically actuate the cutter when said bottom is withdrawn and sever the glass adjacent said outlet.

13. The combination of a container for molten glass having an outlet in the bottom thereof, a chamber beneath said outlet, means to reduce the air pressure within said chamber during the initial discharge of a charge of glass through said outlet, means to then open said chamber and admit atmospheric pressure during the continued discharge of the said charge, and means operating within said chamber to sever the charge.

14. The combination of a container for molten glass, provided with an outlet opening in the bottom thereof, a forming chamber beneath said opening, said chamber having a removable bottom and a side door, a cutter located externally of said chamber, and automatic means to periodically withdraw said bottom, open said side door, and project the cutter into said chamber and cause it to sever the glass.

15. In gob forming apparatus, the combination of a container for molten glass having an outlet opening through which the glass issues, means to periodically sever the glass at a point adjacent said opening, and means to subject the issuing glass to a reduced pressure without mechanical contact with the glass during the initial portion of each period after the glass is severed.

16. In gob forming apparatus, the combination of a container for molten glass having an outlet opening through which the glass issues, means to periodically sever the glass at a point adjacent said opening, means to subject the issuing glass to a reduced pressure without mechanical contact with the glass during the initial portion of each period after the glass is severed, and a regulator operating periodically within the container to exert an expelling force on the glass after it has been subjected to said reduced external pressure.

Signed at Toledo, in the county of Lucas and State of Ohio, this 18th day of December, 1920.

LEONARD D. SOUBIER.